(12) United States Patent
Maas et al.

(10) Patent No.: US 7,341,115 B2
(45) Date of Patent: *Mar. 11, 2008

(54) SOIL AERATOR ASSEMBLY

(75) Inventors: David R. Maas, Owatonna, MN (US); Scott W. Bjorge, Owatonna, MN (US)

(73) Assignee: PlanetAir Turf Products, LLC, Owatonna, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/416,461

(22) Filed: May 2, 2006

(65) Prior Publication Data

US 2006/0272834 A1    Dec. 7, 2006

Related U.S. Application Data

(63) Continuation of application No. 10/776,007, filed on Feb. 10, 2004, now Pat. No. 7,070,005.

(60) Provisional application No. 60/543,225, filed on Feb. 10, 2004.

(51) Int. Cl.
*A01B 45/00* (2006.01)

(52) U.S. Cl. .................. 172/22; 172/497; 172/265

(58) Field of Classification Search .............. 172/21, 172/22, 556, 557, 497, 265, 678, 506, 551, 172/605, 499, 500, 464, 261, 264, 260.5
See application file for complete search history.

(56) References Cited

U.S. PATENT DOCUMENTS

| | | | |
|---|---|---|---|
| 1,704,986 A | 3/1929 | Marcy | |
| 1,965,510 A | 7/1934 | Porter | |
| 2,111,478 A | 3/1938 | McGuire | |
| 2,347,748 A | 5/1944 | Melling | |
| 2,591,572 A | 4/1952 | Mascaro | |
| 2,700,926 A | 2/1955 | Goit | |
| 2,778,291 A | 1/1957 | Kerns | |
| 3,143,090 A | 8/1964 | Cecil et al. | |
| 3,148,737 A | 9/1964 | Lunsford | |
| 3,393,751 A | 7/1968 | Mascaro | |
| 3,522,965 A | 8/1970 | Indzeoski | |
| 3,534,818 A | 10/1970 | Mascaro | |
| 3,586,109 A | 6/1971 | Eversole et al. | |

(Continued)

OTHER PUBLICATIONS

PlanetAir Aerator, "Aerate, Mow, then Putt in just 15 minutes . . . ", Brochure, PlanetAir Turf Products, LLC—believed to have been publicly available before Aug. 11, 2003.

(Continued)

*Primary Examiner*—Thomas B. Will
*Assistant Examiner*—Jamie L McGowan
(74) *Attorney, Agent, or Firm*—Fish & Richardson P.C.

(57) ABSTRACT

In certain embodiments a soil aerator may include a hinged frame assembly that cooperates with one or more weight transferring systems adapted to permit an aeration subassembly to lift off the ground when an aeration tine impacts a hard obstacle such as a rock in the soil. The weight transferring systems may in the preferred embodiments be calibrated so that only minimal upward force, such as that caused by impact of an aeration tine with a rock, may cause the aeration subassembly to lift thereby significantly reducing or preventing damage to the aeration tines and drive assemblies and substantially prolonging the life of the aerator.

40 Claims, 10 Drawing Sheets

U.S. PATENT DOCUMENTS

| | | |
|---|---|---|
| 3,707,132 A | 12/1972 | Hansen |
| 3,797,577 A | 3/1974 | Killion et al. |
| 3,877,401 A | 4/1975 | Gutman |
| 3,939,917 A | 2/1976 | Reed, Jr. et al. |
| 3,993,143 A | 11/1976 | Moreland, Jr. |
| 4,020,907 A | 5/1977 | Luck |
| 4,081,034 A | 3/1978 | Hines |
| 4,084,642 A | 4/1978 | Killion |
| 4,148,362 A | 4/1979 | Orth |
| 4,154,305 A | 5/1979 | Prewett |
| 4,158,391 A | 6/1979 | Clements |
| 4,192,387 A | 3/1980 | Stinson |
| 4,212,357 A | 7/1980 | Clements et al. |
| RE30,705 E | 8/1981 | Hines |
| 4,326,591 A | 4/1982 | Dedoes |
| 4,336,760 A | 6/1982 | Cohen et al. |
| 4,383,580 A | 5/1983 | Huxford |
| 4,489,787 A | 12/1984 | Gary |
| 4,538,689 A | 9/1985 | Dietrich, Sr. |
| 4,550,783 A | 11/1985 | Hansen |
| 4,619,329 A | 10/1986 | Gorbett |
| 4,632,189 A | 12/1986 | Rizzo |
| 4,662,456 A | 5/1987 | Classen |
| 4,699,220 A | 10/1987 | Strohm |
| 4,723,607 A | 2/1988 | Hansen |
| 4,773,486 A | 9/1988 | Huber et al. |
| 4,776,404 A | 10/1988 | Rogers et al. |
| 4,791,995 A | 12/1988 | Hochlan, Jr. |
| 4,840,232 A | 6/1989 | Mayer |
| 4,867,244 A | 9/1989 | Cozine et al. |
| 4,881,602 A | 11/1989 | Hansen et al. |
| 4,899,828 A | 2/1990 | Harris |
| 4,910,948 A | 3/1990 | Nelson |
| 4,924,944 A | 5/1990 | Cozine et al. |
| 4,926,947 A | 5/1990 | Cozine et al. |
| 5,014,791 A | 5/1991 | Kure |
| 5,020,602 A | 6/1991 | Dellinger |
| 5,029,652 A | 7/1991 | Whitfield |
| 5,101,910 A | 4/1992 | Dawson |
| 5,119,880 A | 6/1992 | Zehrung, Jr. et al. |
| 5,152,348 A | 10/1992 | Flanagan, Sr. et al. |
| 5,172,768 A | 12/1992 | Straus |
| 5,207,278 A | 5/1993 | Hatlen |
| 5,209,306 A | 5/1993 | Whitfield |
| 5,398,767 A | 3/1995 | Warke |
| 5,398,768 A | 3/1995 | Staples |
| 5,460,229 A | 10/1995 | Mattis |
| 5,469,922 A | 11/1995 | Bjorge |
| 5,495,895 A | 3/1996 | Sakamoto |
| 5,570,746 A | 11/1996 | Jones et al. |
| 5,579,847 A | 12/1996 | Postema |
| 5,586,603 A | 12/1996 | Mattis |
| 5,586,604 A | 12/1996 | Postema |
| 5,615,744 A | 4/1997 | Krafka |
| 5,623,996 A | 4/1997 | Postema |
| 5,662,172 A | 9/1997 | Brown |
| 5,673,756 A | 10/1997 | Classen |
| 5,680,903 A | 10/1997 | Oliver |
| 5,690,179 A | 11/1997 | Dickson |
| 5,709,272 A | 1/1998 | Jones et al. |
| 5,709,273 A | 1/1998 | Roth |
| 5,765,645 A | 6/1998 | Postema |
| 5,769,169 A | 6/1998 | Miksitz |
| 5,803,181 A | 9/1998 | Hsu |
| 5,806,293 A | 9/1998 | Klein et al. |
| 5,816,336 A | 10/1998 | Underhill |
| 5,823,269 A | 10/1998 | Leclerc |
| 5,868,206 A | 2/1999 | Miller |
| 5,906,090 A | 5/1999 | Knudsen |
| 5,934,055 A | 8/1999 | Steele |
| 5,937,953 A | 8/1999 | Melberg et al. |
| 6,003,612 A | 12/1999 | Knight et al. |
| 6,003,613 A | 12/1999 | Reincke |
| 6,038,989 A | 3/2000 | Comer et al. |
| 6,041,869 A | 3/2000 | Lewis et al. |
| 6,102,129 A | 8/2000 | Classen |
| 6,149,169 A | 11/2000 | Chelgren |
| 6,179,061 B1 | 1/2001 | Fiore |
| 6,241,025 B1 | 6/2001 | Myers et al. |
| 6,273,197 B1 | 8/2001 | Marlow |
| 6,321,849 B1 | 11/2001 | Underhill |
| 6,415,872 B2 | 7/2002 | Myers et al. |
| 6,425,161 B1 | 7/2002 | LeMeur et al. |
| 6,460,318 B1 | 10/2002 | Ferris et al. |
| 6,484,811 B1 | 11/2002 | Edwards |
| 6,513,603 B2 | 2/2003 | Bjorge |
| 6,543,798 B2 | 4/2003 | Schaffner et al. |
| 6,659,190 B2 | 12/2003 | Jessen |
| 6,691,791 B2 | 2/2004 | Bjorge |
| 6,758,283 B2 | 7/2004 | Lauer et al. |
| 6,805,205 B1 | 10/2004 | Gabard |
| 7,070,005 B2 * | 7/2006 | Maas et al. .................. 172/22 |
| 7,096,968 B2 | 8/2006 | Maas et al. |
| 2003/0230417 A1 | 12/2003 | Maas et al. |

OTHER PUBLICATIONS

PlanetAir Aerator, "Innovation that improves and protects your piece of the planet . . . ," Brochure, PlanetAir Turf Products, LLC—believed to have been publicly available before Aug. 11, 2003.

PlanetAir Aerator, "Aerate. Mow. Play.", Brochure, PlanetAir Turf Products, LLC—believed to have been publicly available before Aug. 11, 2003.

* cited by examiner

SOIL AERATOR ASSEMBLY

CROSS-REFERENCE TO RELATED APPLICATIONS

This application is a continuation of U.S. patent application Ser. No. 10/776,007, filed on Feb. 10, 2004 now U.S. Pat. No. 7,070,005 by David R. Maas et al. and entitled "Soil Aerator Assembly," which claims the benefit of U.S. Provisional Application Ser. No. 60/543,225, filed on Feb. 10, 2004 by David Maas et al. and entitled "Soil Aerator Assembly," the entirety of these applications are hereby incorporated as if fully set forth herein.

TECHNICAL FIELD

This document relates to aerating soil, and in certain embodiments to a soil aeration system.

BACKGROUND

Soil aeration is a conventional technique used by groundskeepers to reduce compaction in the ground soil, stimulate plant growth, and promote proper drainage. Soil may become compacted from overuse or environmental effects, which ultimately affects the soil permeability and development of rooted plants within the soil. In particular, compacted soil restricts the amount of oxygen that can enter the soil and the amount of carbon dioxide that can escape. Not all soils are affected equally by overuse and environmental factors. The amount of compaction depends on soil composition, the amount of vegetation, and the moisture content of the soil. Periodic soil aeration relieves the compaction in the soil before the negative effects overburden the soil to the point that it can no longer support desirable vegetation.

In general, soil aerators penetrate the ground using coring tubes that penetrate the ground and remove "plugs" of soil. Depending on the penetration force of the aeration tubes and the hardness of the ground surface, the aerator frame and wheels may be lifted from the ground surface as the aeration tube impacts and attempts to penetrate the ground. Moreover, when the aeration tubes impact hard objects such as rocks in the soil the shock may be absorbed entirely by the aeration tubes and the drive system, which may cause significant damage or destroy the tubes or drive components.

Conventional coring tube aeration systems can actually worsen the condition of the soil damage to the soil. Coring tubes may substantially compact the soil as the tubes penetrate the soil. Accordingly, the walls of the resulting cylindrical hole may become compressed and compacted, thereby making the hole walls substantially impermeable to air and moisture. Aeration with conventional coring tube aeration systems may thus be counterproductive.

Towable soil aerators typically have two wheels (e.g., a right and a left wheel) and a hitch device to attach the soil aerator frame to a tractor. The two wheels are commonly attached to opposing ends of a crossbar member, which is rigidly connected (e.g., welded) to the remaining portions of the frame. This construction provides a rigid frame that may be pulled behind the tractor as the two wheels roll over the ground surface and the aeration tubes penetrate the soil. Such a rigid construction, however, poses problems when the wheels encounter uneven soil topography or other surface aberrations. If, for example, a wheel strikes a sizeable bump or rock while the other wheel remains on the flat ground surface, the rigidly constructed frame becomes non-level with the ground surface and the aeration tubes do not uniformly penetrate the soil.

SUMMARY

In certain embodiments a soil aerator may include a hinged frame assembly that cooperates with one or more weight transferring systems adapted to permit an aeration subassembly to lift off the ground when an aeration tine impacts an obstacle such as a rock in the soil. The weight transferring systems may in the preferred embodiments be calibrated so that only minimal upward force, such as that caused by impact of an aeration tine with a rock, may cause the aeration subassembly to lift thereby significantly reducing or preventing damage to the aeration tines and drive assemblies and substantially prolonging the life of the aerator.

In various embodiments a soil aerator may also be advantageously equipped with multiple suspension systems to permit the aeration subassembly to remain substantially level with and in proximity to a ground surface to be aerated even when the wheels of the aerator pass over uneven surfaces. Certain implementations of the suspension systems may permit substantial absorption of impacts and vibration transmitted to the wheel from bumps or other objects on the ground surface. As such, the aeration tines in those embodiments may substantially uniformly penetrate the soil to form aeration pockets even as the wheels of the soil aerator travel over non-uniform paths. Certain embodiments of the suspension systems may reduce the overall vibration and fatigue on the soil aerator frame and drive components as the soil aerator is rolled over uneven ground surfaces.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
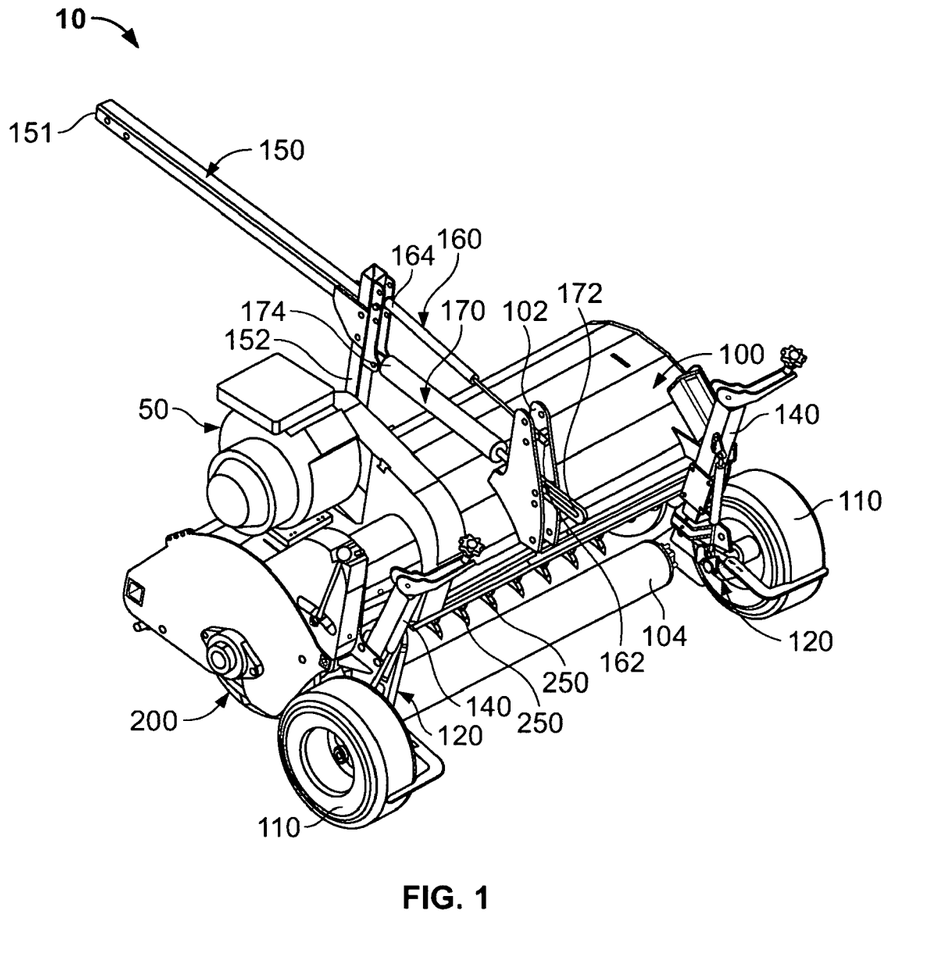
FIG. 1 is a perspective view of a soil aerator in accordance with an embodiment of the invention.
Figure 2:
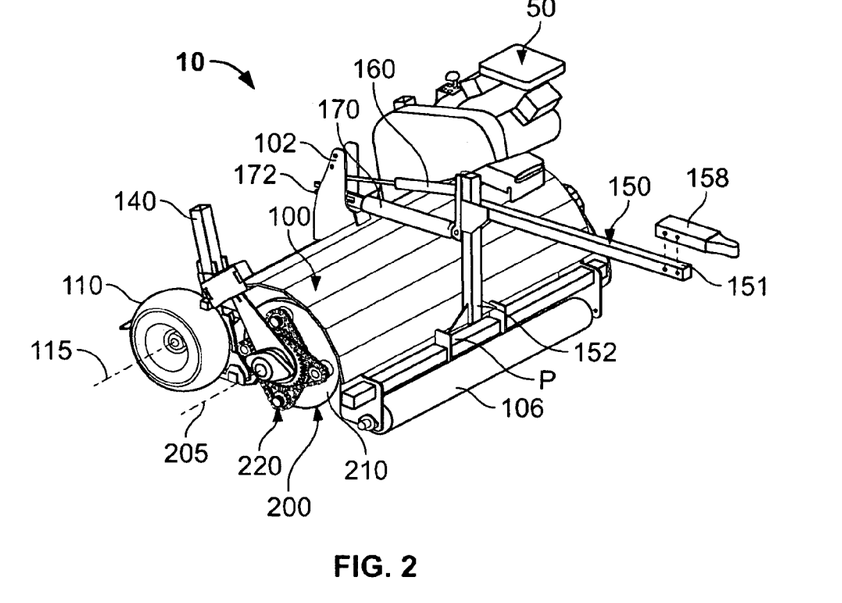
FIG. 2 is a perspective view of the soil aerator of FIG. 1, with a side panel removed to show an embodiment of a soil aeration apparatus.

Referring to FIGS. 1 and 2, a soil aerator 10 includes a drive means 50, a frame 100, and a soil aeration apparatus 200. The soil aerator 10 includes left and right wheels 110 and a variable speed drive motor 50 to rotate a soil aeration apparatus 200 to form aeration pockets in the ground using aeration tines 250. Each wheel 110 is coupled to a separate suspension system 120 that is in turn coupled to the frame 100. The left and right wheels 110 are axially aligned with one another, but the wheels 110 are not interconnected to a single axel. Rather, each suspension system 120 is coupled to one of the wheels 110 and coupled to a jack member 140 of the frame 100 such that the right wheel's movement relative to the frame 100 is independent from the left wheel's movement relative to the frame 100 (described more in connection with FIGS. 7-9).

A connection shaft 150 is coupled to the frame 100 and includes a receiving end 151 that is capable of interconnecting with a towing attachment device. In this embodiment, the soil aerator 10 is adapted for a one-point towable connection to a tractor or utility vehicle (not shown). For example, a tow-hitch device 158 (FIG. 2) may be coupled to the receiving end 151 for connection to a complimentary ball-hitch device on a utility vehicle. Thus, the soil aerator may be towed behind the utility vehicle using a ball-hitch assembly to move the aeration apparatus 200 over the ground surface. Of course, other connection assemblies to join the connection shaft 150 with a vehicle may be used depending on the type of towing vehicle and the operator's preferences. The connection shaft 150 is rigidly connected to a vertical member 152, which is rotatably engaged with the front of the frame 100 at pivot axis P. As such, the frame 100 may pivot about axis P relative to the vertical member 152 and connection shaft 150. The frame 100 may also include a lifting device 170, such as a pneumatic or hydraulic cylinder, to lift the soil aeration apparatus 200 from the ground surface while the frame 100 is turning or moving over a non-soil surface. For example, while the connection shaft 150 is connected to a vehicle, the lifting device 170 may extend to push the actuator arm 172 away from the cylinder head 174. This cylinder extension causes the frame 100 to rotate about a pivot axis P counterclockwise in the view of FIG. 2 and, accordingly, causes the soil aeration apparatus 200 to lift from the ground surface (described more in connection with FIGS. 10A-B).

Still referring to FIGS. 1 and 2, the frame 100 includes a constant force spring 160 that is connected at one end 164 to the pivot shaft 152 and connected at the opposing end 162 to fin member 102 on the rear side of the frame 100. The constant force spring 160 provides an extension force between the vertical member 152 and the frame 100, thus creating a moment on the frame 100 that compels the wheels 110 coupled to the rear portion of the frame 100 toward the ground surface. For example, the weight-transferring device 160 may be a gas spring device having a cylinder head 164 pinned to the top portion of the vertical member 152 and an actuator arm 162 pinned to the fin member 102. The gas spring device 160 may be configured to be under compression when in the position shown in FIG. 1, thus applying a force that urges the fin member 102 away from the vertical member 152. Such an extension force creates a moment on the frame 100 and effectively redistributes the weight of the soil aerator 10 that is support by the wheels 110 (described more in connection with FIGS. 11A-B).

Referring to FIG. 2, the soil aeration apparatus 200 is mounted to the frame 100 forward of the wheels 110 such that the central axis 205 of the soil aeration apparatus 200 is offset from and substantially parallel to the wheel axis 115. The apparatus 200 includes a planetary gear system 220 on the outer side of each carrier 210 (a side panel has been removed from the frame 100 in FIG. 2 to better view one of the two carriers). The planetary gear system 220 controls the timing and the movement of tine-holder shafts as the aeration tines penetrate the ground surface to form aeration pockets. Thus, as the vehicle tows the frame 100 over the ground surface, the frame 100 maintains proper height and attitude of the aeration apparatus 200.

Figure 3:
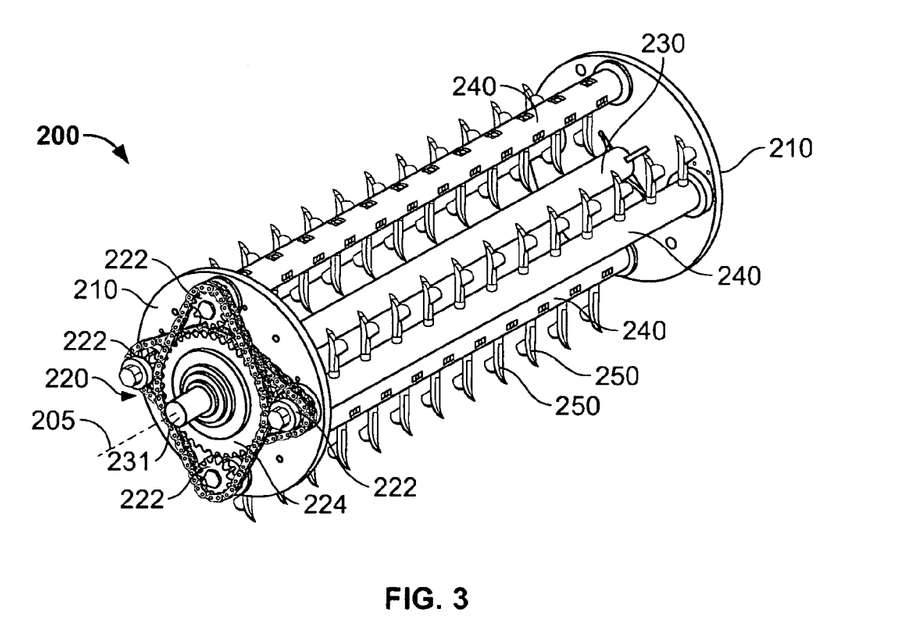
FIG. 3 is a perspective view of the soil aeration apparatus of FIG. 2.

Turning to FIG. 3, this embodiment of the aeration apparatus 200 includes four tine-holder shafts 240, each of which includes a set of aeration tines 250 mounted thereto. The aeration tines 250 extend in a radial direction from the tine-holder shafts 240 so that when the tine-holder shaft 240 is positioned in proximity to the ground surface, the aeration tines 250 are capable of penetrating the ground surface to form aeration pockets. The tine-holder shafts 240 are positioned substantially parallel to one another and mounted between two opposing carriers 210. Each tine-holder shaft 240 is rotatably mounted to the carriers 210 such that each shaft 240 may rotate about its own central axis while revolving about the central axis 205 of the apparatus 200. In addition, a central support shaft 230 is journaled to rotate about the drive shaft 231 and is positioned substantially parallel to the tine-holder shafts 240 and rigidly mounted between the carriers 210 to maintain the fixed relationship between the carriers 210. The planetary gear system 220 includes planetary gears 222 coupled to the tine-holder shafts 240 with a sun gear 224 positioned along the central axis 205 of the soil aeration apparatus 200. The drive motor 50 rotates the drive shaft 231 and the sun gear 224 rigidly attached thereto. The planetary gear system 220 provides the desired rotational motion of the tine-holder shafts 240 as the shafts 240 revolve about the central axis 205. Another planetary gear system 220 may be mirrored on the outer side (not shown) of the opposing carrier 210 to eliminate undesirable torsion in the tine-holder shafts 240. Of course, other configurations of the carriers and the gear system may be used to provide various rotational and revolutionary movements of the tine-holder shafts 240, depending on the number of tine-holder shafts 240 and the shape and desired motion of the aeration tines. In addition, a separate gear system, timing system, or the like may be coupled to one or both carriers 210 to provide the rotational motion of the carriers 210 from the drive motor 50.

Figure 4:
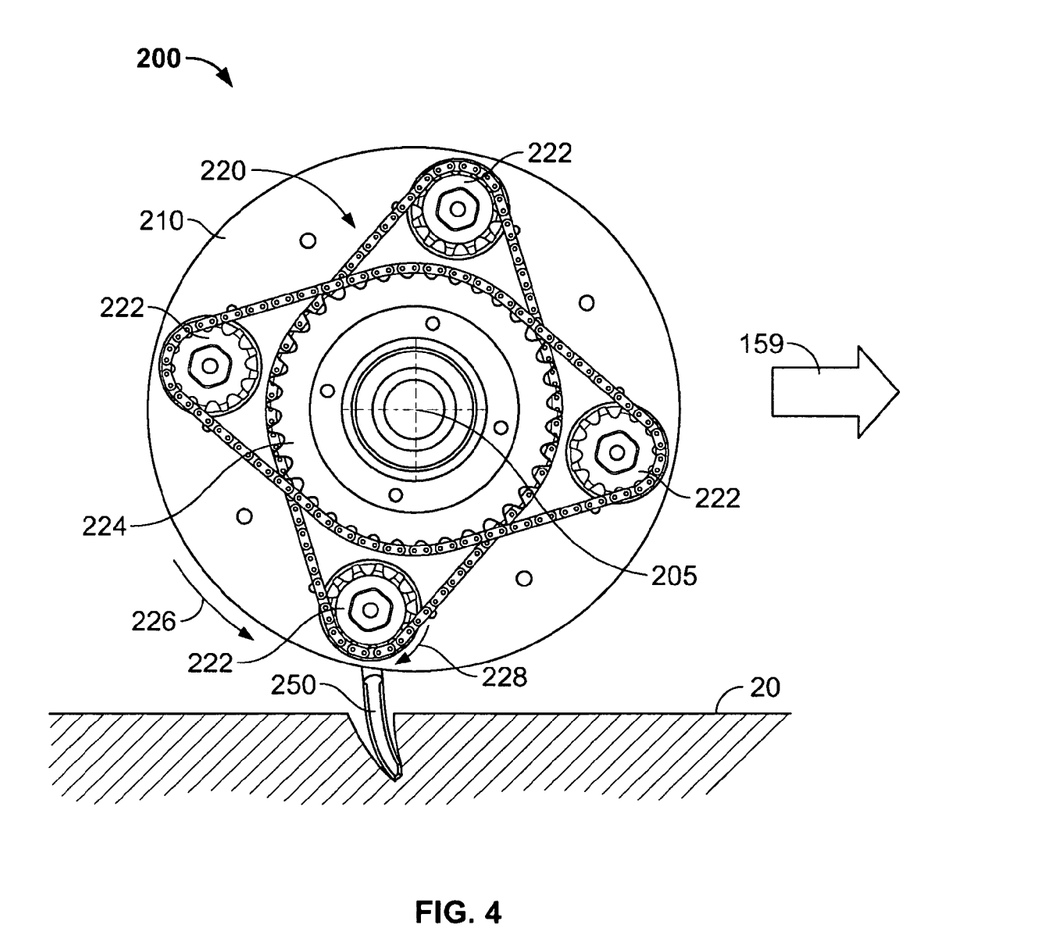
FIG. 4 is a side view of the soil aeration apparatus of FIG. 3.

Referring to FIG. 4, one embodiment of the soil aeration apparatus 200 causes each tine-holder shaft 240 to rotate about its own central axis in a clockwise direction 228 as all of the tine-holder shafts 240 revolve about the central axis 205 in a counterclockwise direction 226. In addition, the entire apparatus 200 is transported over the ground surface 20 as a towing force 159 is applied to the frame 100. This compound motion of the tine-holder shafts 240 causes the aeration tines 250 to penetrate the ground surface 20 at an acute angle and to subsequently form and aeration pocket in the soil.

Figure 5A:
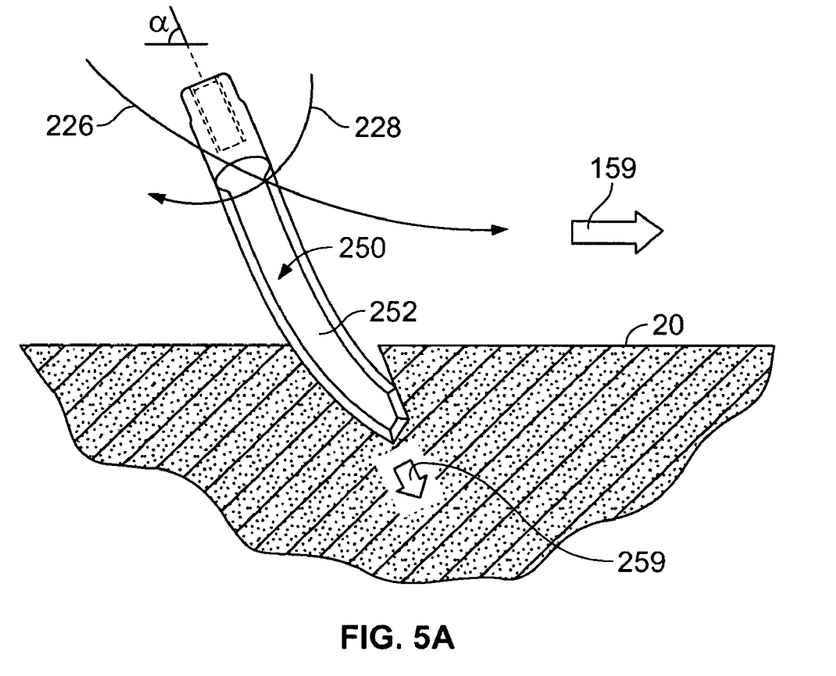
FIG. 5 is a side view of an aeration tine of the soil aeration apparatus of FIG. 4.
Figure 5B:
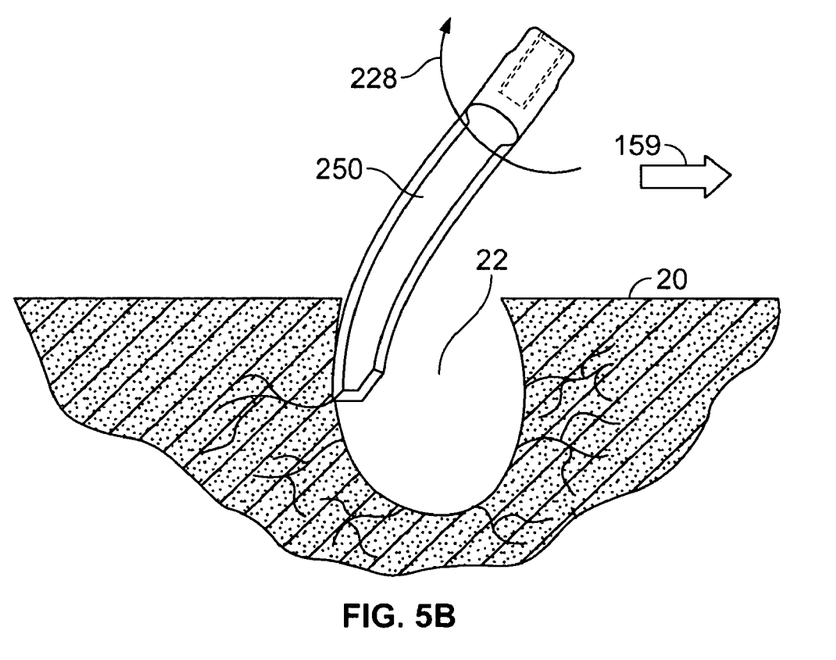

FIGS. 5A-B show an example of the aeration tine 250 penetrating the ground surface and forming an aeration pocket. Referring to FIG. 5A, the revolutionary motion 226 of the tine-holder shafts 240 draws the aeration tine 250 to the ground surface 20, and the rotational motion 228 of the tine-holder shaft causes the tine 250 to be positioned at an acute angle α relative to the ground surface 20 as the tine 250 penetrates the ground surface 20. In this embodiment, the aeration tine has an arcuate portion 252 that may produce a plowshare effect as it initially penetrates the soil. As the aeration tine 250 penetrates the ground surface 20, the forces applied to the tine 250 (e.g., the towing force 159 and other forces transmitted from the tine-holder shaft) along with the angle of entry and the shape of the arcuate portion 252 create a downward force on the tine 250 similar to that observed by a conventional plowshare as it is forced along the topsoil. This plowshare effect caused by the aeration tine 250 prevents or reduces undesirable lifting of the soil aeration apparatus 200 that is commonly associated with conventional soil aerators.

Referring to FIG. 5B, the aeration tine 250 completes the formation of the aeration pocket 22 as the tine-holder shaft 240 continues its counterclockwise revolutionary motion 226 and its clockwise rotational motion 228. In this embodiment, the aeration tine 250 does not include an aeration tube, so no plug is removed from the soil and deposited on the ground surface 20. Rather, the arcuate portion 252 of the aeration tine 250 cuts an aeration groove having a longer dimension in the direction of the cut, which provides a degree of aeration comparable to that provided by conventional end-coring tubes. The aeration pockets 22 are visible, but no significant amount of soil is deposited on the ground surface 20. Accordingly, the ground need not be further treated (as by mowing) before being ready for use, for example, as a golf course fairway or putting green.

Figure 6A:
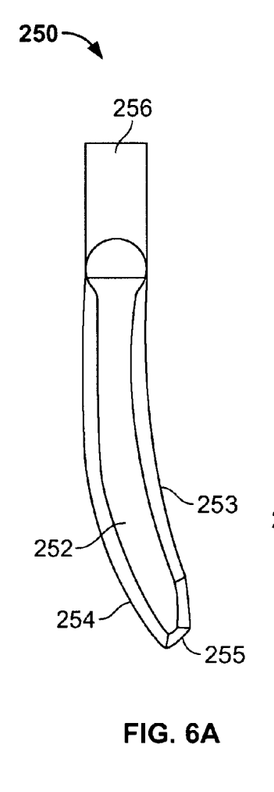
FIGS. 6A-C are side views of various embodiments of aeration tines that may be implemented with the soil aeration apparatus of FIG. 3.
Figure 6B:
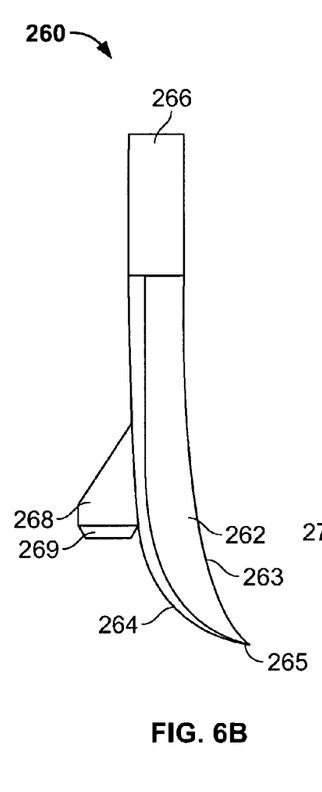
Figure 6C:
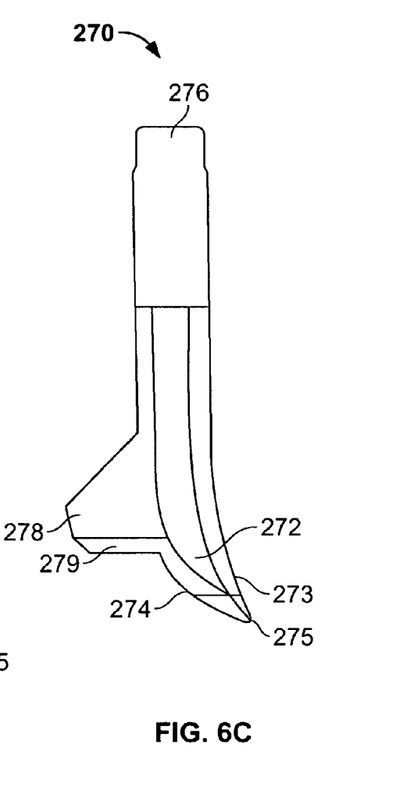

Referring to FIGS. 6A-C, various configurations of aeration tines may be implemented with the soil aeration apparatus 200. FIG. 6A shows the embodiment of the aeration tine 250 previously described in connection with FIGS. 5A-B. The arcuate portion 252 of the aeration tine 250 includes concave blade edge 253 and a convex blade 254 edge that converge at a tip portion 255. In addition, the aeration tine 250 includes a mounting portion 256 opposite the tip portion 255. The mounting portion 256 has a mounting means, such as a threaded cavity or shaft or another suitable structure, to cooperate with a corresponding mounting element on tine-holder shaft 240. As such, the aeration tines 250 may be releasably mounted to the soil aeration apparatus 200, which facilitates removal of aeration tines 250 for quick sharpening or replacement.

FIG. 6B shows another embodiment of an aeration tine 260 that may be implemented with the soil aeration apparatus 200. The aeration tine 260 includes an arcuate portion 262, a concave edge 263, a convex edge 264, a tip portion 265, and a mounting portion 266 that operate somewhat similar to the previously described embodiment. The aeration tine 260 of FIG. 6B includes an aeration tube 268 mounted along the convex edge 264 such that a conical cutting edge 269 may cut a soil plug as the tine 260 is driven into the soil. The aeration tube 268 may be integrally formed with the arcuate portion 262 or may be attached to the convex edge 264 using such as by welding. The aeration tube 268 is preferably positioned a distance rearward of the tip portion 265 to enable the arcuate portion 262 to penetrate and fracture the soil before the aeration tube 268 cuts a soil plug free of the soil. The result is that a soil aeration pocket is formed with minimal soil compaction and displacement. As the aeration tine 260 cuts an aeration pocket, the aeration tube 268 removes a soil plug of substantially smaller volume in comparison to the end-coring method. As a result, less soil is left on top of the ground surface because the soil plugs formed by the aeration tine 260 are smaller than soil plugs formed by conventional cylindrical end-coring tubes. Yet, the aeration pockets formed in the soil are comparable in size to holes formed by the end-coring tubes.

FIG. 6C shows another embodiment of an aeration tine 270 that may be implemented with the soil aeration apparatus 200. The aeration tine 270 includes an arcuate portion 272, a concave edge 273, a convex edge 274, a tip portion 275, and a mounting portion 276 that operate somewhat similar to the embodiment described in connection with FIG. 6A. The aeration tine 270 also includes an aeration tube 278 having a cutting edge 279 to cut a plug of soil as the tine 270 penetrate the soil. The aeration tube 278 may be integrally form with the arcuate portion 272 or may be attached to the convex edge 274 using suitable attachment means, such as welding. Similar to the embodiment described in connection with FIG. 6B, the aeration tube 278 is positioned a distance rearward of the tip portion 275 to enable the arcuate portion 272 to penetrate and fracture the soil before the aeration tube 278 cuts a soil plug free of the soil.

Figure 7:
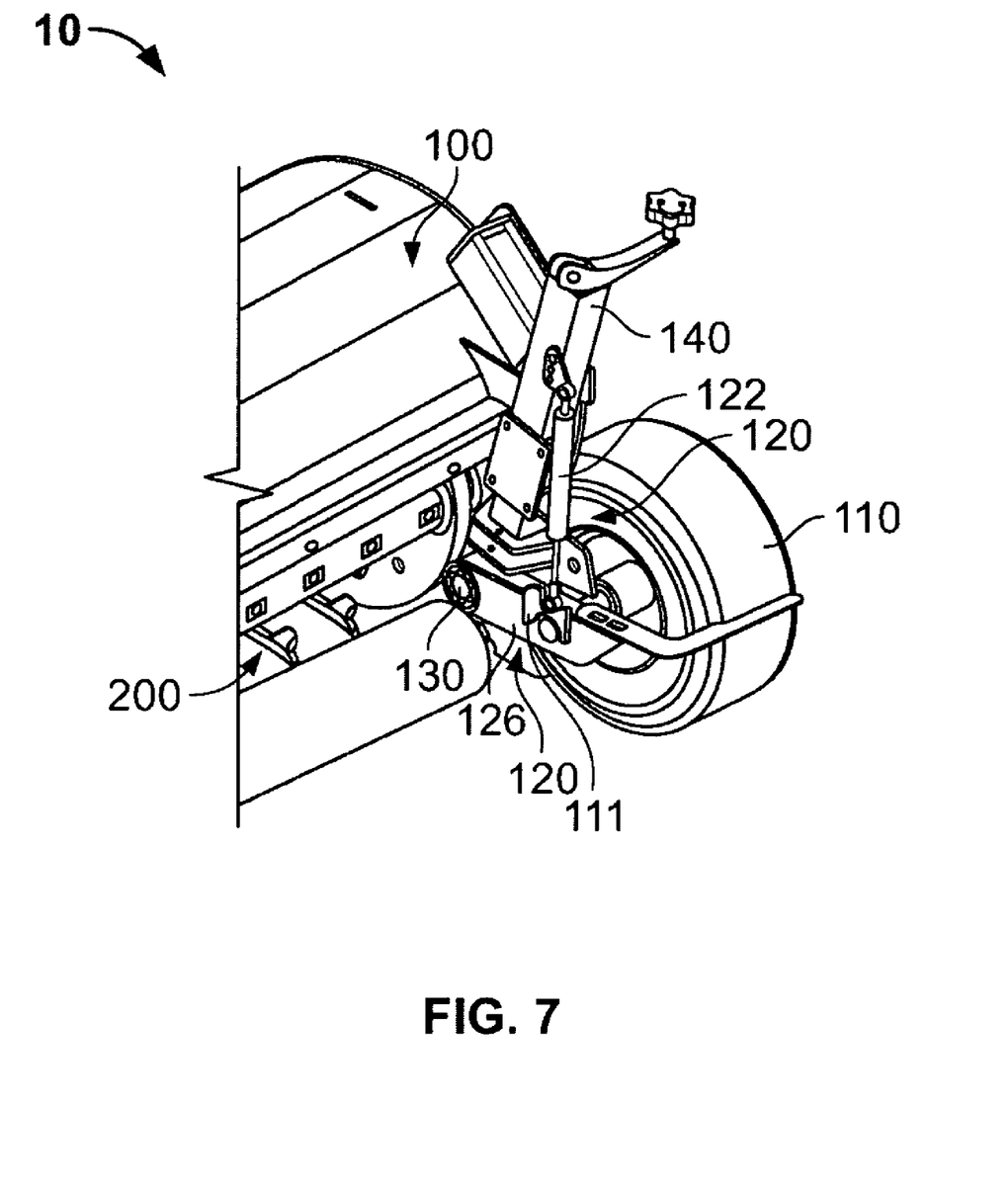
FIG. 7 is a perspective view of a portion of the soil aerator of FIG. 1.

Referring to FIG. 7, each of the left and right wheels 110 of the soil aerator 10 is coupled to a separate suspension system 120 that is capable of asymmetrically absorbing an impact from bumps or other objects on the ground surface. As a result, the frame 100 and soil aeration apparatus 200 are substantially maintained at a proper height and attitude even though one wheel 110 is momentarily displaced when striking a small bump or indentation in the ground surface.

The suspension system also includes a constant force spring 122 in the form of a gas charged cylinder. In some embodiments, gas spring devices may be preferable for their ability to store elastic energy per unit of weight and the capability of controlling the spring rate. The constant force spring operates to transfer weight as described above in connection with FIGS. 1-2. More particularly, the lower end of spring 122 may be mounted in one of the various holes 111, each of which provides the spring 122 with a different leverage relative to pivot point 130. In the view of FIG. 7, the leftmost hole provides the least leverage advantage. The spring 122 tends to urge the frame in the counterclockwise direction (clockwise in the view of FIG. 2), thereby tending to transfer weight from the rear wheels 110 to the front roller 106. This torque tends to permit the frame 100 to more easily rotate clockwise in the view of FIG. 2 when an aeration tine strikes an obstacle, thereby allowing soil aerator 200 to lift upwards and alleviating the shock of the impact. The spring 122 can be calibrated as desired by selection of spring constant and mounting holes.

The suspension system may include a separate primary spring member that provides the main support for wheel 110 or rather the spring 122 can serve that function. In either embodiment, the spring member is capable of absorbing the momentary displacement of the wheel 110 as it strikes a bump on the ground surface, thus reducing or eliminating the displacement of the frame 100 (and the soil aeration apparatus). Moreover, the spring may reduce the overall vibration and mechanical fatigue applied to the soil aerator frame 100 as the wheels 110 roll over uneven paths.

The suspension device is coupled to an suspension arm 126 and a jack member 140. The jack member 140 is a component of the frame 100 that may be used to adjust the height of the frame 100 and soil aeration apparatus 200 from the ground prior to operating the soil aerator 10. When the soil aerator 10 is used in operation, the jack member 140 is substantially rigidly secured to the other components of the frame 100. The suspension arm 126 is moveably engaged with the jack member 140, for example, along a bushing connection 130.

Figure 8:
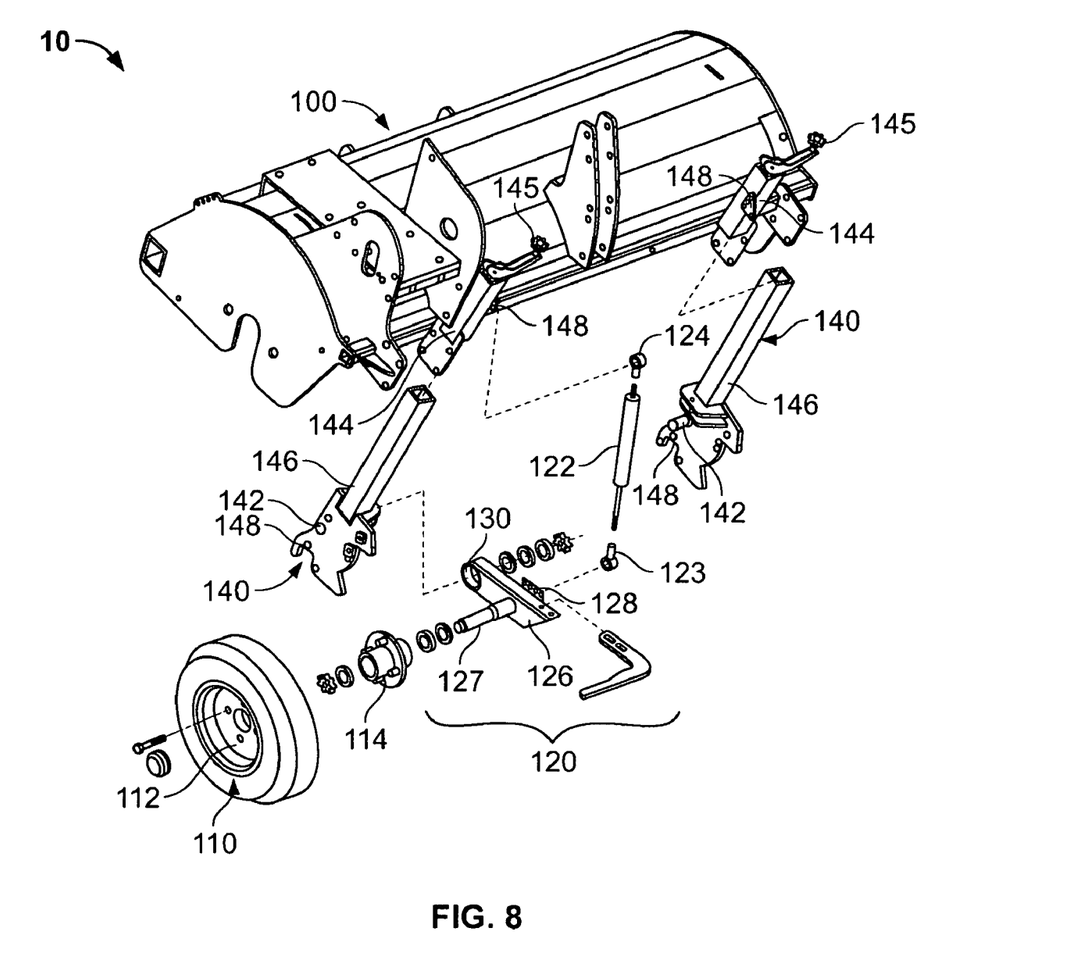
FIG. 8 is an exploded perspective view of a portion of the soil aerator of FIG. 1.

FIG. 8 shows an exploded perspective view of the frame 100, one of the independent suspension systems 120, and the left wheels 110. (The right wheel 110 and its corresponding independent suspension system 120 and are shown in FIG. 7, but are removed from FIG. 8 to better show the exploded view. In this embodiment, it should be understood that the right wheel 110 and its corresponding independent suspension 120 have an assembly that mirrors the left wheel 110 and its corresponding independent suspension system 120 shown in FIG. 8). Each jack member 140 includes an adjuster portion 144 and an extension portion 146 such that a crank 145 may be maneuvered to change the position of the extension portion 146 relative to the adjuster portion 144. This adjustment feature permits the user to set the height of the frame 100 and the soil aeration apparatus 200 from the ground before the soil aerator 10 is used in operation. The lower portion of the jack member 140 may include other holes 148 for attaching other components to the frame 100, such as a rear roller 104 (FIG. 1). In addition, each jack member 140 includes a bushing connector 142 that rotatably engages the bushing 130 on the corresponding axel member 126. The suspension arm 126 may pivot about the bushing connector 142 such that an axel shaft 127 may move relative to the jack member 140. The hub 112 and bearing 114 of the wheel 110 mount to the axel shaft 127 such that the wheel 110 may rotate about the axel shaft 127.

Still referring to FIG. 8, the suspension arm 126 also includes a flange 128 for coupling with the suspension device 122. The flange may have multiple holes, each of which is capable of connecting with a rod end 123 of the suspension device 122. The user may connect the suspension device 122 to different holes in the flange 128 to adjust the relief provided by the suspension device 122. Another flange 148 on the jack member 140 connects with a rod end 124 of the suspension device 122. Thus, the suspension device 122 is coupled to the suspension arm 126 and the jack member 140 so as to restrain the pivoting motion of the suspension arm 126 relative to the jack member 140.

In operation, the suspension device 122 and the suspension arm 126 of the suspension system 120 operate to absorb the impact from the wheel 110 striking a bump or other object in the ground surface 20. For example, when the wheel encounters a small bump or indentation in the ground surface 20, the suspension arm 126 may pivot relative to the jack member 140 (and the rest of the frame 100) while the suspension device 122 compresses or extends to accommodate the momentary displacement.

Figure 9A:
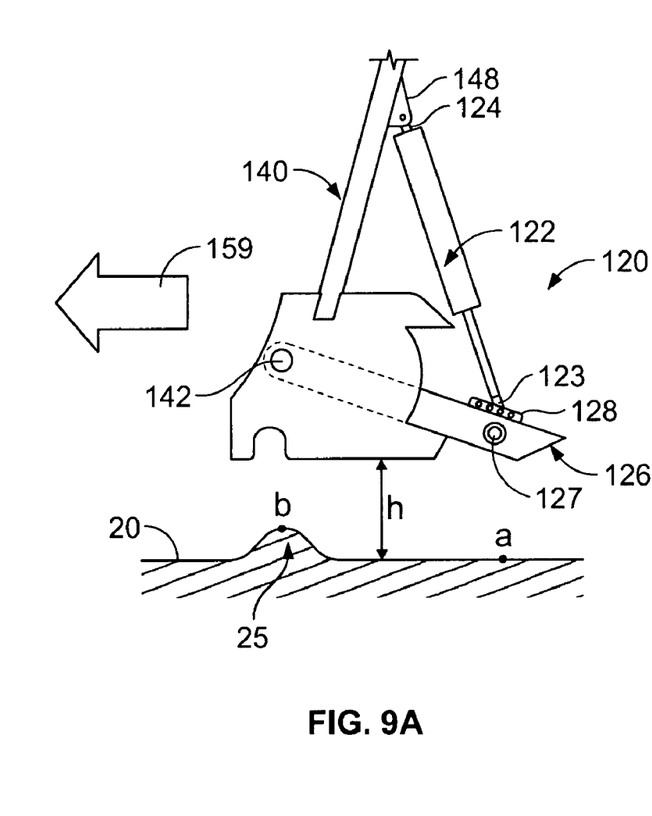
FIGS. 9A-B are a side view of an independent suspension system of FIG. 1.

FIG. 9A shows the jack member 140 and the independent suspension system 120 moving over the ground surface 20 (with the wheel 110 removed from view to better show the operation of the independent suspension system 120). The soil aerator 10 is towed over the ground surface 20 by a vehicle that supplies a towing force 159. As the axel shaft 127 (which is rotatably mounted with the wheel 110) is moved over a patch of relatively flat ground at point a, the jack member 140 moves at a steady-state height h over the ground surface 20. The frame 100 is substantially rigidly secured to the jack member 140 and also moves over the ground surface 20 at a steady-state height, thus substantially maintaining the soil aeration apparatus 200 at a proper height above the ground.

Figure 9B:
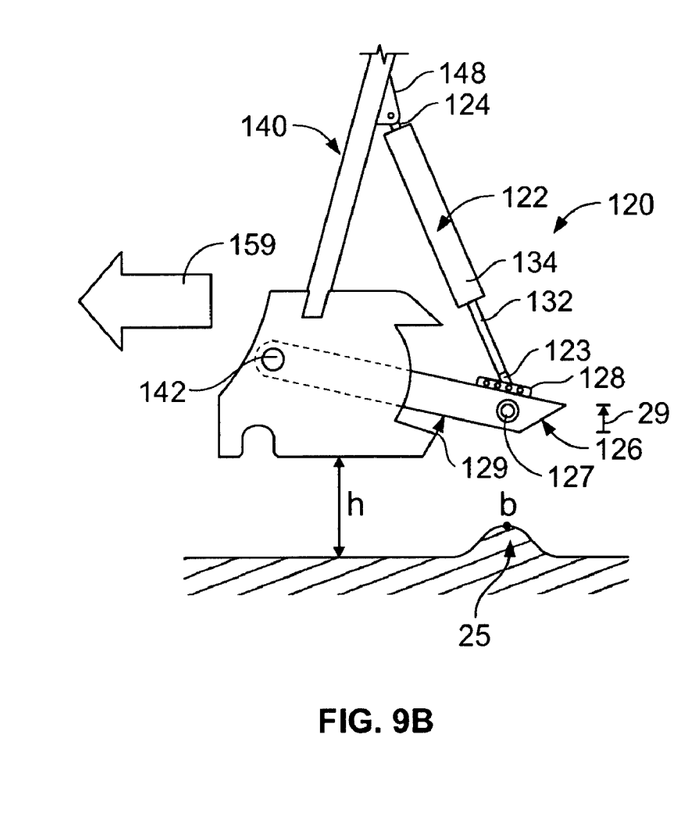

Referring to FIG. 9B, when the wheel 110 moves over a bump 25 in the ground surface 20 at point b, the axel shaft 127 is displaced upward along with the wheel hub 112. Accordingly, the suspension arm 126 pivots about the bushing connector 142 and undergoes a momentary displacement 129. The momentary displacement 129 is substantially absorbed by the suspension device 122 while the jack member 140 (and the remaining components of the frame 100) remain substantially at the steady-state height above the ground surface 20. As the suspension arm 126 undergoes the momentary displacement 129, the actuator arm 132 is compressed into the cylinder portion 134 to absorb the impact 29 from the bump 25. The gas spring device 122 may have a controlled rate of extension, which limits the velocity at which the actuator arm 132 extends out from the cylinder portion 134 (controlled release of the stored energy in the gas spring device) and returns to the steady-state position. Optionally, the gas spring device 122 may be a strut that includes an internal damping mechanism to prevent rapid extension of the actuator arm 132. As mentioned above, the leverage of the spring device 122 may be adjusted by connecting the rod end 123 on the actuator arm 132 to a different hole on the flange 128. By connecting the rod end 123 to a hole that is closer to the cylinder portion 134, the leverage advantage is decreased.

Still referring to FIGS. 9A-B, each wheel may be coupled to a corresponding suspension system 120. Thus, a first wheel 110 may be rolling over a relatively flat ground surface (e.g., point a on the ground surface) while a second wheel 110 may be rolling over a bump 25 (e.g., point b on the ground surface). Yet, the frame 100 and soil aeration apparatus 200 are substantially maintained at the proper height and attitude because the independent suspension systems 120 operate to substantially absorb any impacts from the ground surface.

Figure 10A:
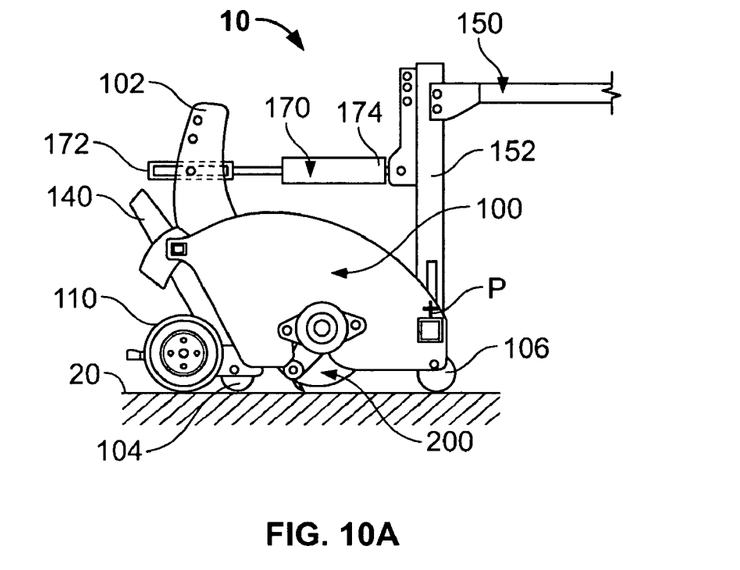
FIGS. 10A-B are side views of a portion of the soil aerator of FIG. 1.
Figure 10B:
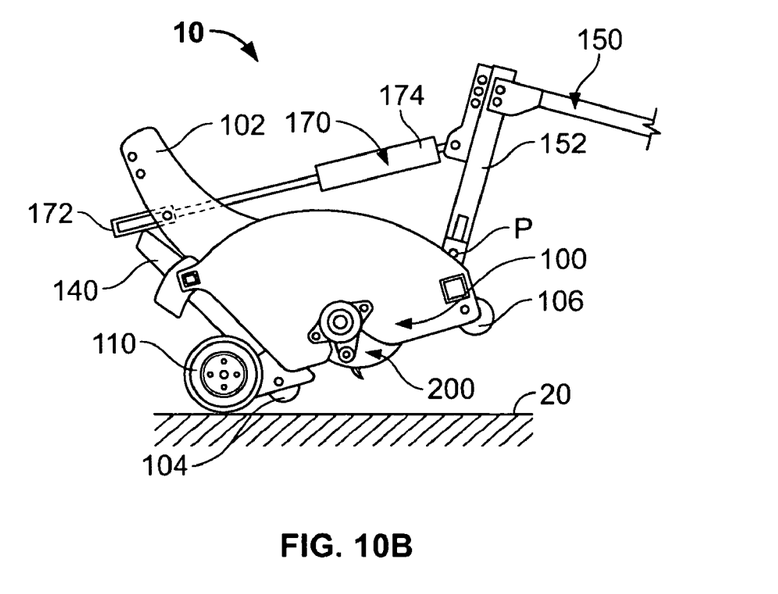

Referring now to FIGS. 10A-B, the towing vehicle operator may control the lifting device 170 to lift soil aeration apparatus 200 from the ground surface 20 while the soil aerator is being towed. For example, if the soil aerator is approaching a concrete surface or other surface that is not intended for aeration, the lifting device 170 may be actuated to temporarily lift the aeration apparatus 200 from the ground to prevent damage to the aeration tines 250, the ground surface, or both. The weight-transferring device 160 is removed from FIGS. 10A-B to better view the operation of the lifting device 170, but it should be understood that the lifting device 170 may properly function with or without the weight-transferring device 160 attached to the frame 100.

FIG. 10A shows the soil aerator in operational mode where the cylinder actuator arm 172 is substantially retracted such that the wheels 110 contact the ground surface and the aeration apparatus 200 is maintained at the proper height above the ground surface 20. The connection shaft 150 is connected to a towing vehicle using, for example, a ball-hitch assembly. In this embodiment, the lifting device 170 is a pneumatic cylinder that includes a cylinder head 174 pinned to the pivot shaft 152 and an actuator arm 172 pinned to the fin member 102 of the frame 100. The actuator arm 172 includes a slider slot such that the pinned connection to the fin member 102 may slide back and forth in response to minor movements of the frame 100.

Referring to FIG. 10B, the operator controls the lifting device 170 to lift the aeration apparatus from the ground surface 20 by extending the actuator arm 172 away from the cylinder head 174. This extension force pushes the fin member 102 away from the pivot shaft 152, which is connected to the towing vehicle via the connection shaft 150. As a result, the frame 100 pivots about the pivot axis P to lift the front roller 106 and the aeration apparatus 200 off the ground surface such that the aeration tines 250 do not contact the ground surface 20. The soil aerator 10 may be maintained in this position and towed over the ground by the towing vehicle as the wheels 110 support the frame 100 and the apparatus 200 in the lifted position. Thus, a soil aerator 10 having a one-point towable connection to the utility vehicle may have the soil aeration apparatus 200 controllably lifted from the ground surface without the need for a three-point hitch system or other hydraulic-powered linkages on the towing vehicle.

Figure 11A:
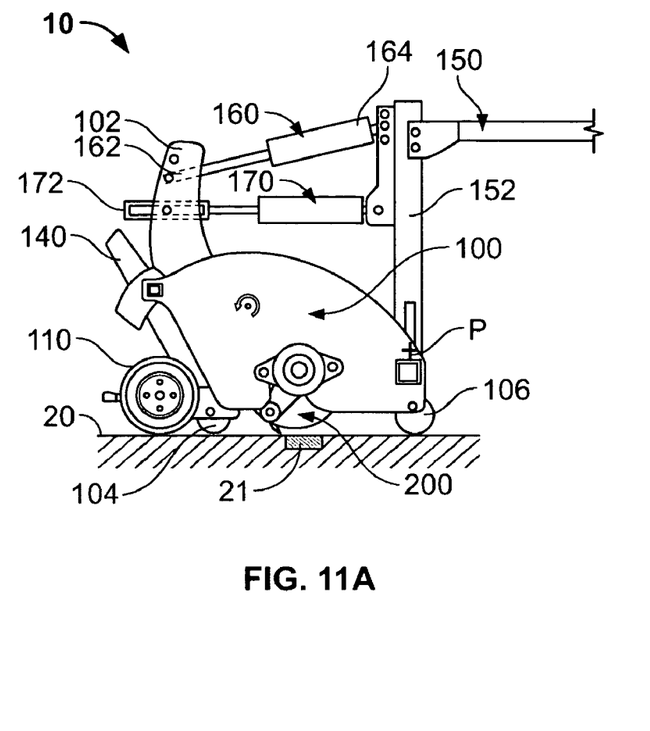
FIGS. 11A-B are side views of the soil aerator of FIG. 1.
Figure 11B:
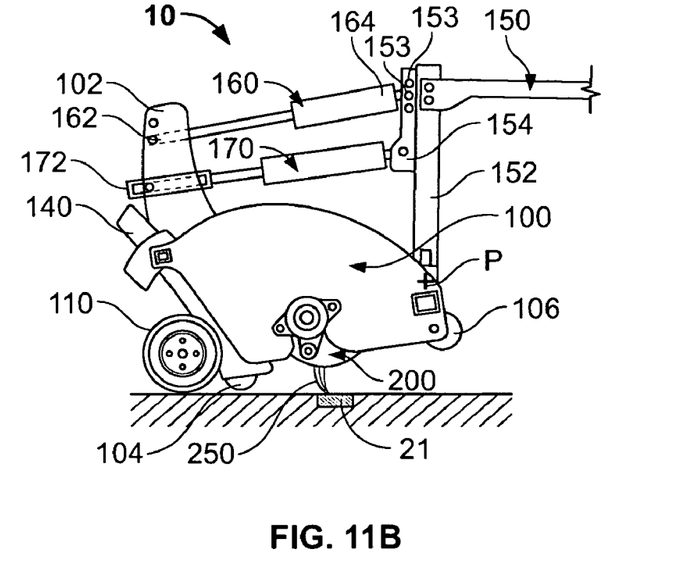

Referring to FIGS. 11A-B, the weight-transferring device 160 operates to shift the weight of the soil aerator away from the front roller 106 and onto the wheels 110 coupled to the rear portion of the frame. In FIG. 11A, the soil aerator 10 is operational mode such that the lifting device 170 is substantially retracted and the soil aeration apparatus 200 is substantially maintained at a proper height over the ground surface 20. The connection shaft is connected to a towing vehicle using, for example, a ball-hitch assembly so that the soil aerator 10 is towed over the ground surface 20. In this embodiment, the weight-transferring device 160 is a constant force gas spring having a cylinder head 164 that is pinned to the pivot shaft 152 and a cylinder actuator arm 162 that is pinned to the fin member 102 of the frame 100. When the soil aerator is in the operational mode, the gas spring device 160 is under compression and thus applies an extension force between the pivot shaft 152 and the fin member 102.

The force from the weight-transferring device 160 may not be sufficient by itself to cause the frame to rotate about the pivot axis P, yet the weight-transferring device applies a moment to the frame 100 that effectively redistributes the weight of the soil aerator off of the front roller 106 and onto the wheels 110. For, example, without the weight-transferring device 160 in place, the components of the soil aerator 10 that contact the ground—including the wheels 110 and the front roller 106—may equally bear the burden of the weight of the soil aerator 10. However, with the weight-transferring device 160 in place, the weight of the soil aerator 10 is distributed such that the wheels 110 support a greater portion of the weight. As such, the front side of the soil aerator 10 (e.g., the front roller 106) may be lifted from the ground with measurably less force than the force required to lift the wheels 110 from the ground.

Referring to FIG. 11B, the weight-transferring device may be implemented to provide relief for the soil aeration apparatus 200 and the aeration tines 250 when the tines impact a hard obstacle 21 such as a rock. If the hard obstacle 21 is substantially impenetrable, the aeration tine 250 that impacts the surface 21 may cause the soil aeration apparatus 200 to be lifted from the regular height (shown in FIG. 11A). If the aeration tine 250 is required to bear a substantial portion of the soil aerator's weight (e.g., the soil aerator is completely lifted from the ground surface and supported by the aeration tines), the tines or other parts of the soil aeration apparatus 200 may be damaged. However, the weight-transferring device 160 operates to redistribute the weight of the soil aerator 10 such that the front portion (e.g., the front roller 106) of the frame 100 and the soil aeration apparatus will readily lift away from the ground upon the application of a modest upwards force through the tines. As shown in FIG. 11B, the front roller 106 of the frame 100 and the soil aeration apparatus 200 may be elevated as the frame 100 rotates about the pivot axis P in order to provide relief to the aeration tine 250 as it impacts the hard obstacle 21. Because the wheels 110 remain on the ground and bear a substantial portion of the soil aerator's weight, the aeration tine 250 does not bear the entire weight of the soil aerator 10, thus reducing the likelihood of damage to the tine 250 or other parts of the soil aeration apparatus 200.

Springs other than constant force springs may be used. Traditional gas or helical springs may be used instead. The gas spring device 160 may optionally have a controlled rate of extension or other internal damping means which limit the velocity at which the actuator arm 162 extends and retracts, although this in some applications may actually decrease the shock relief provided by the weight transfer systems. The springs may be advantageously made adjustable by providing pneumatic or other known means of manually controlling the spring rate.

It will be understood from the foregoing discussion that the front and rear weight transfer systems are in the foregoing embodiments opposing systems. The front weight transfer spring 160 operates to urge the frame 100 counter-clockwise in FIG. 11 whereas the rear weight transfer springs 122 have the opposite effect. This provides optimal adjustablility. By adjustment of the spring rate and leverage advantage of the opposing spring systems (which may include complete removal of the front or rear weight transfer springs), the aeration device can be provided with the precise amount of desired head weight. For soft soil conditions and with aeration tine arrangements which provide the plowshare effect described above, it may not be necessary to have any head weight. In that case, it may be desirable to set the springs systems to provide only nominal head weight so as to maximize the shock absorbing effect of the suspension components. In other situations and with other aeration tine setups where more head weight may be desired, the spring rates and leverage points may be adjusted to increase the head weight.

Moreover, the weight-transferring device 160 creates a moment on the frame 100 that effectively compels the wheels 110 toward the ground surface 20. In some circumstances, this effect from the weight-transferring device 160 may provide additional suspension for the wheels 110 and fame 100 by absorbing some impact as the wheels 110 roll over a bump or other object in the ground. Depending on the spring rate and the dampening means of the weight-transferring device, the wheels 110 may more closely follow the contours of the ground surface while the frame 100 is maintained at the proper height.

The soil aerator 10 may be constructed to have a relatively lightweight and efficient structure that maintains the aeration apparatus 200 at a satisfactory height and attitude, but the scope of the invention is not limited to the illustrative embodiments depicted in FIGS. 1-11.

For example, the soil aerator 10 is not limited to two-wheel embodiment shown in FIGS. 1-2. Rather, the aerator 10 may include any number of wheels 110. For example, a soil aerator may include four wheels: right-side front and rear wheels, and left-side front and rear wheels. In such an embodiment, each wheel 110 may be coupled to an independent suspension system 120 that is in turn coupled to the frame 100.

In other embodiments, one or more of the weight-transferring device 160, the lifting device 170, and the separate suspension systems 120 may be omitted. These components, as well as the remaining components and features described above, are properly understood to be discrete features which may be included or omitted as desired to achieve the desired functionalities.

Furthermore, the soil aerator 10 may be connected to a towing vehicle using an attachment system other than a one-point connection device 158. For example, the soil aerator may be adapted to attach to a three-point hitch system for towing behind a tractor or other vehicle.

In addition, the drive means to power the motion of the soil aeration apparatus 200 need not be attached to the soil aerator frame 100. Rather, the towing vehicle may provide the drive means, such as a PTO shaft that extends from the tractor to which the soil aerator is connected. Alternately the motive force can be provided by the rotation of the wheels themselves so long as proper traction can be maintained and it is not desired to have independent control over the rotation of the carrier 210.

Still other embodiments may have no drive mechanism other than the carrier itself. It has been observed that so long as a sufficient number of holder shafts are disposed on the carrier, the carrier may be permitted to rotate freely as the aeration device 200 is pulled across soil in response to which the tines will engage the soil and cause the carrier to rotate. The carrier then continues under its own momentum, executing the aeration process without a separate drive means.

A number of embodiments of the invention have been described. Nevertheless, it will be understood that various modifications may be made without departing from the spirit and scope of the invention. Accordingly, other embodiments are within the scope of the following claims.

What is claimed is:

1. A method for aerating a ground surface, comprising:
    moving an aerator over a ground surface, the aerator comprising a frame assembly, an aeration device coupled to the frame assembly, a front axle member located forward of the aeration device, a rear axle member located aft of the aeration device, and a weight transfer system coupled to the frame assembly, wherein the weight transfer system includes at least two spring members that apply opposite moments to the frame assembly; and
    causing a bias device of the weight transfer system to apply a moment to the frame assembly so as to compel the aeration device away from the ground surface by transferring a portion of the frame assembly and aeration device's combined weight to the front axle member or the rear axle member.

2. The method of claim 1, wherein the weight transfer system is adapted to transfer a variable fraction of the weight of the aeration device to at least one of the front axle member and the rear axle member such that a head weight of the aeration device can be varied.

3. The method of claim 1, wherein the aerator is moved over the ground surface by a roller coupled to the front axle member, a first wheel coupled to the first rear axle member, and a second wheel coupled to a second rear axle member.

4. The method of claim 1, wherein the bias device of the weight transfer system includes a first spring member coupled to the frame assembly.

5. The method of claim 4, wherein the weight transfer system further includes a second spring member coupled to the rear axle member and the frame assembly.

6. The method of claim 1, wherein the aerator comprises at least two rear axle members each coupled to the frame by a separate suspension system.

7. The method of claim 1, wherein the bias device of the weight transfer system includes a constant force spring.

8. The method of claim 1, further comprising rotating and translating a plurality of tine shafts of the aeration device using a planetary gear system of the aeration device, the plurality of tine shafts bearing aeration tines.

9. The method of claim 8, wherein each aeration tine includes a curved soil fracturing edge.

10. The method of claim 1, wherein the frame assembly is hinged and the aeration device is urged about the hinge axis by the weight transfer system.

11. A method for aerating a ground surface, comprising:
    moving an aerator over a ground surface, the aerator comprising a frame assembly, an aeration device coupled to the frame assembly, a front axle member located forward of the aeration device, a rear axle member located aft of the aeration device, and a weight transfer system coupled to the frame assembly; and
    causing the weight transfer system to apply a moment to the frame assembly so as to transfer a portion of the frame assembly and aeration device's combined weight to the front axle member or the rear axle member,
    wherein the weight transfer system includes a constant force spring.

12. The method of claim 11, wherein the weight transfer system is adapted to transfer a variable fraction of the weight of the aeration device to at least one of the front axle member and the rear axle member such that a head weight of the aeration device can be varied.

13. The method of claim 11, wherein the aerator is moved over the ground surface by a roller coupled to the front axle member, a first wheel coupled to the first rear axle member, and a second wheel coupled to a second rear axle member.

14. The method of claim 11, wherein the weight transfer system includes a first spring member coupled to the frame assembly.

15. The method of claim 14, wherein the weight transfer system further includes a second spring member coupled to the rear axle member and the frame assembly.

16. The method of claim 11, wherein the aerator comprises at least two rear axle members each coupled to the frame by a separate suspension system.

17. The method of claim 11, wherein the weight transfer system includes at least two spring members that apply opposite moments to the frame assembly.

18. The method of claim 11, wherein the frame assembly is hinged and the aeration device is urged about the hinge axis by the weight transfer system.

19. The method of claim 11, further comprising rotating and translating a plurality of tine shafts of the aeration device using a planetary gear system of the aeration device, the plurality of tine shafts bearing aeration tines.

20. The method of claim 19, wherein each aeration tine includes a curved soil fracturing edge.

21. A method for aerating a ground surface, comprising:
    moving an aerator over a ground surface, the aerator comprising a frame assembly, an aeration device coupled to the frame assembly, a front axle member located forward of the aeration device, a rear axle member located aft of the aeration device, and a weight transfer system coupled to the frame assembly; and
    causing a bias device of the weight transfer system to apply a moment to the frame assembly so as to compel the aeration device away from the ground surface by transferring a portion of the frame assembly and aeration device's combined weight to the front axle member or the rear axle member,
    wherein the bias device of the weight transfer system includes a constant force spring.

22. The method of claim 21, wherein the weight transfer system is adapted to transfer a variable fraction of the weight of the aeration device to at least one of the front axle member and the rear axle member such that a head weight of the aeration device can be varied.

23. The method of claim 21, wherein the aerator is moved over the ground surface by a roller coupled to the front axle member, a first wheel coupled to the first rear axle member, and a second wheel coupled to a second rear axle member.

24. The method of claim 21, wherein the bias device of the weight transfer system includes a first spring member coupled to the frame assembly.

25. The method of claim 24, wherein the weight transfer system further includes a second spring member coupled to the rear axle member and the frame assembly.

26. The method of claim 21, wherein the aerator comprises at least two rear axle members each coupled to the frame by a separate suspension system.

27. The method of claim 21, wherein the weight transfer system includes at least two spring members that apply opposite moments to the frame assembly.

28. The method of claim 21, further comprising rotating and translating a plurality of tine shafts of the aeration device using a planetary gear system of the aeration device, the plurality of tine shafts bearing aeration tines.

29. The method of claim 28, wherein each aeration tine includes a curved soil fracturing edge.

30. The method of claim 21, wherein the frame assembly is hinged and the aeration device is urged about the hinge axis by the weight transfer system.

31. A method for aerating a ground surface, comprising:
    moving an aerator over a ground surface, the aerator comprising a frame assembly, an aeration device coupled to the frame assembly, a front axle member located forward of the aeration device, a rear axle member located aft of the aeration device, and a weight transfer system coupled to the frame assembly; and
    causing a bias device of the weight transfer system to apply a moment to the frame assembly so as to compel the aeration device away from the ground surface by transferring a portion of the frame assembly and aeration device's combined weight to the front axle member or the rear axle member,
    wherein the frame assembly is hinged and the aeration device is urged about the hinge axis by the weight transfer system.

32. The method of claim 31, wherein the weight transfer system is adapted to transfer a variable fraction of the weight of the aeration device to at least one of the front axle member and the rear axle member such that a head weight of the aeration device can be varied.

33. The method of claim 31, wherein the aerator is moved over the ground surface by a roller coupled to the front axle member, a first wheel coupled to the first rear axle member, and a second wheel coupled to a second rear axle member.

34. The method of claim 31, wherein the bias device of the weight transfer system includes a first spring member coupled to the frame assembly.

35. The method of claim 34, wherein the weight transfer system further includes a second spring member coupled to the rear axle member and the frame assembly.

36. The method of claim 31, wherein the aerator comprises at least two rear axle members each coupled to the frame by a separate suspension system.

37. The method of claim 31, wherein the weight transfer system includes at least two spring members that apply opposite moments to the frame assembly.

38. The method of claim 31, wherein the bias device of the weight transfer system includes a constant force spring.

39. The method of claim 31, further comprising rotating and translating a plurality of tine shafts of the aeration device using a planetary gear system of the aeration device, the plurality of tine shafts bearing aeration tines.

40. The method of claim 39, wherein each aeration tine includes a curved soil fracturing edge.

* * * * *